(12) United States Patent
Murakami et al.

(10) Patent No.: US 7,885,133 B2
(45) Date of Patent: Feb. 8, 2011

(54) MEMORY CONTROL DEVICE

(75) Inventors: Daisuke Murakami, Kyoto (JP); Yuji Takai, Osaka (JP); Takahide Baba, Hyogo (JP)

(73) Assignee: Panasonic Corporation, Osaka (JP)

( * ) Notice: Subject to any disclaimer, the term of this patent is extended or adjusted under 35 U.S.C. 154(b) by 413 days.

(21) Appl. No.: 12/090,397

(22) PCT Filed: Oct. 19, 2006

(86) PCT No.: PCT/JP2006/320871

§ 371 (c)(1),
(2), (4) Date: Apr. 16, 2008

(87) PCT Pub. No.: WO2007/046481

PCT Pub. Date: Apr. 26, 2007

(65) Prior Publication Data

US 2009/0282270 A1    Nov. 12, 2009

(30) Foreign Application Priority Data

Oct. 20, 2005   (JP) .............................. 2005-305511

(51) Int. Cl.
*G11C 7/00* (2006.01)

(52) U.S. Cl. .................. 365/222; 365/233.1; 711/105; 711/106

(58) Field of Classification Search ............... 365/222, 365/233.1; 711/105, 106
See application file for complete search history.

(56) References Cited

U.S. PATENT DOCUMENTS

| | | | |
|---|---|---|---|
| 5,881,018 A * | 3/1999 | Lee ...................... | 365/233.12 |
| 6,084,813 A | 7/2000 | Kikuchi et al. | |
| 6,560,158 B2 | 5/2003 | Choi et al. | |
| 6,781,911 B2 | 8/2004 | Riesenman et al. | |
| 7,583,551 B2 * | 9/2009 | Klein ...................... | 365/222 |
| 2002/0026601 A1 | 2/2002 | Shiraga et al. | |
| 2002/0105845 A1 | 8/2002 | Hidaka | |
| 2002/0184438 A1 * | 12/2002 | Usui ...................... | 711/106 |
| 2003/0084235 A1 * | 5/2003 | Mizuki ................... | 711/105 |
| 2003/0200382 A1 * | 10/2003 | Wells et al. ............. | 711/106 |
| 2004/0184336 A1 * | 9/2004 | Shore et al. ............. | 365/222 |
| 2005/0249011 A1 | 11/2005 | Maeda | |
| 2005/0283572 A1 | 12/2005 | Ishihara | |

FOREIGN PATENT DOCUMENTS

JP          05-28757          2/1993

(Continued)

*Primary Examiner*—Tuan T Nguyen
*Assistant Examiner*—Toan Le
(74) *Attorney, Agent, or Firm*—McDermott Will & Emery LLP

(57) ABSTRACT

A clock enable (CKE) control circuit (112) is provided between a memory control circuit (111) and a SDRAM (120). When a system is in, e.g., a sleep state, the CKE control circuit (112) controls a CKE signal outputted to the SDRAM (120) such that it is fixed to a Low level. As a result, it is possible to halt a power supply provided to the memory control circuit (111), while maintaining the low-power-consumption mode of the SDRAM (120), so that power consumption resulting from a leakage current is suppressed. In addition, it becomes also possible to reset the memory control circuit (111), while maintaining the low-power-consumption mode of the SDRAM (120).

5 Claims, 6 Drawing Sheets

FOREIGN PATENT DOCUMENTS

| | | |
|---|---|---|
| JP | 2000-207292 | 7/2000 |
| JP | 2002-140138 | 5/2002 |
| JP | 2002-358231 | 12/2002 |
| JP | 2003-007061 | 1/2003 |
| JP | 2005-044460 A | 2/2005 |

* cited by examiner

MEMORY CONTROL DEVICE

TECHNICAL FIELD

The present invention relates to a memory control device for controlling an operation of a volatile semiconductor memory having a low-power-consumption mode.

BACKGROUND ART

In battery-driven mobile equipment, low power consumption is required of an individual semiconductor device. Accordingly, as a SDRAM (Synchronous Dynamic Random Access Memory) which is known as one of volatile semiconductor memories, one having as a low-power-consumption mode such as a power-down (PDW) mode, a self-refresh (SRF) mode, or a deep-power-down (DPD) mode has been developed.

There has been conventionally known a technology which automatically shifts the SDRAM to the SRF mode upon detecting a shift of a processor to a sleep state, thereby achieving power savings, while retaining data in the SDRAM (Patent Documents 1 and 2).

Patent Document 1: Japanese Laid-Open Patent Publication No. 2002-140138

Patent Document 2: Japanese Laid-Open Patent Publication No. 2002-358231

DISCLOSURE OF THE INVENTION

Problems to be Solved by the Invention

Irrespective of the low-power-consumption mode the SDRAM shifts to, to maintain the low-power-consumption mode, it is necessary to hold a clock enable (CKE) signal supplied to the SDRAM on a Low level. Accordingly, it has been conventionally impossible to halt a power supply to a memory control circuit for controlling an operation of the SDRAM after the shift of the SDRAM to the low-power-consumption mode and thereby achieve further power savings. It has also been impossible to reset the memory control circuit, while maintaining the low-power-consumption mode of the SDRAM.

An object of the present invention is to allow a volatile semiconductor memory device to maintain a low-power-consumption mode even when a power supply to a memory control circuit is halted or the memory control circuit is reset.

Means for Solving the Problems

To attain the object, in the present invention, a memory control device for controlling an operation of a volatile semiconductor memory constructed to maintain a low-power-consumption mode by receiving a specified signal held on a predetermined logic level is provided with an additional circuit for transmitting that one of various signals supplied from a memory control circuit to control the operation of the volatile semiconductor memory which corresponds to the specified signal, wherein the additional circuit has a function of fixing the specified signal for the volatile semiconductor memory to the predetermined logic level irrespective of an output of the memory control circuit upon receipt of a specified control signal from the memory control circuit.

EFFECT OF THE INVENTION

In accordance with the present invention, the function of the additional circuit interposed between the memory control circuit and the volatile semiconductor memory allows the volatile semiconductor memory to maintain the low-power-consumption mode even when a power supply to the memory control circuit is halted or the memory control circuit is reset.

Figure 1:
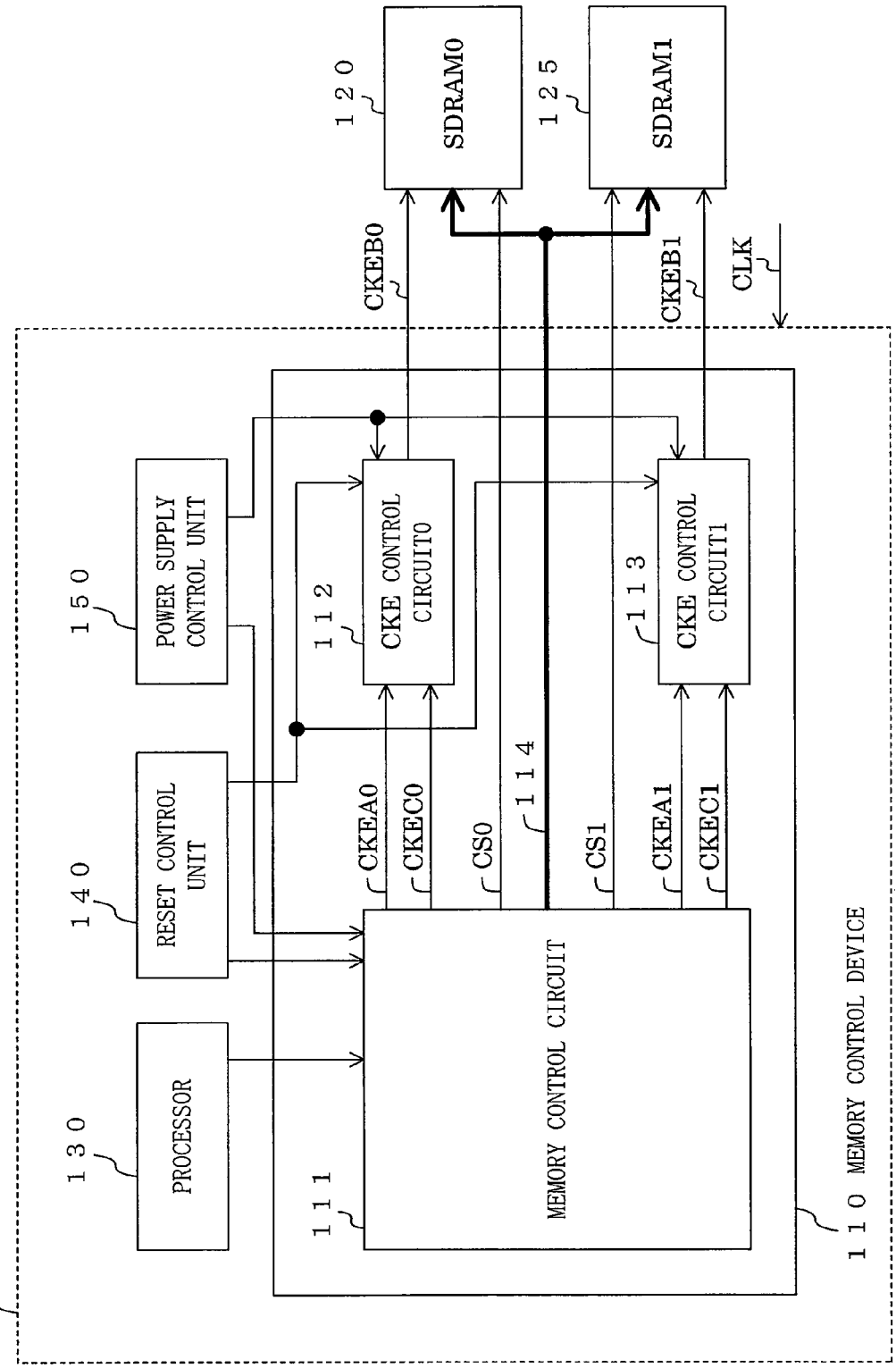
FIG. 1 is a block diagram showing an example of a structure of a memory control device according to the present invention and an example of connections between a data processing system comprising the memory control device and a plurality of SDRAMs.

DESCRIPTION OF NUMERALS 100, 400 Data Processing System
110, 410 Memory Control Device
111, 411 Memory Control Circuit
112, 113, 412 CKE Control Circuit
114, 414 Memory Control Bus
120, 125, 420 SDRAM
130, 430 Processor
140, 440 Reset Control Unit
150, 450 Power Supply Control Unit
451 Power Supply Control Signal
452 Power Supply Control Switch
453 Power Supply Line for Memory Control Device
510 Instruction Decoder
511 D Flip-Flop
512 Selector
513 Inverter
520 NOR Circuit
521, 522 P-Channel MOS Transistor
523, 524 N-Channel MOS Transistor

BEST MODE FOR CARRYING OUT THE INVENTION

Referring to the drawings, the embodiments of the present invention will be described hereinbelow in detail.

FIG. 1 shows an example of a structure of a memory control device 110 according to the present invention and an example of connections between a data processing system 100 comprising the memory control device 110 and first and second SDRAMs 120 and 125. The data processing system 100 and the first and second SDRAMs 120 and 125 constitute single information processing equipment. The first SDRAM 120 is selected with a first chip select signal (CS0), while the second SDRAM 125 is selected with a second chip select signal (CS1). In the following description, the first and second SDRAMs 120 and 125 will be referred to as a SDRAM0 and a SDRAM1, respectively. Each of the CS0 and the CS1 is a negative logic signal.

The data processing system 100 of FIG. 1 comprises the memory control device 110, a processor 130, a reset control unit 140, and a power supply control unit 150. The memory control device 110 comprises a memory control circuit 111, a first CKE control circuit 112, and a second CKE control circuit 113. The first CKE control circuit 112 is interposed between the memory control circuit 111 and the SDRAM0, while the second CKE control circuit 113 is interposed between the memory control circuit 111 and the SDRAM1. CLK denotes a clock signal given to the data processing system 110. In the following description, the first and second CKE control circuits 112 and 113 will be referred to as a CKE control circuit0 and a CKE control circuit1, respectively.

In the memory control device 110 of FIG. 1, the memory control circuit 111 has the function of controlling respective operations of the SDRAM0 and the SDRAM1, specifically the function of controlling a read/write access, a refresh operation, a low-power-consumption mode, and the like. The CKE control circuit0 receives a CKE signal (CKEA0) and a CKE control signal (CKEC0) each supplied from the memory control circuit 111 to pass the CKEA0 as a CKEB0 without any alteration and supply it to the SDRAM0 or fix the CKEB0 to be supplied to the SDRAM0 to the Low level irrespective of the CKEA0 in accordance with an instruction given by the CKEC0. The CKE control circuit1 receives a CKE signal (CKEA1) and a CKE control signal (CKEC1) each supplied from the memory control circuit 111 to pass the CKEA1 as a CKEB1 without any alternation and supply it to the SDRAM1 or fix the CKEB1 to be supplied to the SDRAM1 to the Low level irrespective of the CKEA1 in accordance with an instruction given by the CKEC1. A memory control bus 114 between the memory control circuit 111 and each of the SDRAM0 and the SDRAM1 is a bus for transmitting other control signals such as a row address strobe signal (RAS), a column address strobe signal (CAS), and a write enable signal (WE), a clock signal, and an address signal. Each of the RAS, the CAS, and the WE is a negative logic signal.

The CKE control circuit0 can be composed of a combinational logic circuit, a D flip-flop, and a selector. Preferably, the CKEC0 is transmitted via two pulse signal lines. One of the pulse signal lines transmits a pulse signal for specifying a through mode, while the other pulse signal line transmits a pulse signal for specifying a fixed-Low-level mode. The combinational logic circuit receives these pulse signals and sets or resets the D flip-flop. The selector outputs the CKEA0 as the CKEB0 without any alteration or outputs a signal fixed to the Low level as the CKEB0 in accordance with an output of the D flip-flop. The same holds true with the CKE control circuit1 and the CKEC1.

The processor 130 gives various commands to the memory control circuit 111. From the reset control unit 130, 2-system reset signals which are a rest signal to the memory control circuit 111 and a rest signal to each of the CKE control circuit0 and the CKE control circuit1 are outputted individually. From the power supply control unit 150, 2-system power supplies which are a power supply to the memory control circuit 111 and a power supply to each of the CKE control circuit0 and the CKE control circuit1 are provided individually. However, if the reset signal to the CKE control circuit0 and the reset signal to the CKE control circuit1 are provided individually in different systems and the power supply to the CKE control circuit0 and the power supply to the CKE control circuit1 are provided individually in different systems, the mutual independence of the CKE control circuit0 and the CKE control circuit1 increases. The hardware of the memory control circuit 111 is constructed to hold the CKEC0 and the CKEC1 immediately before entering a power-supply halted state till an instruction for a change is given next.

Figure 2:
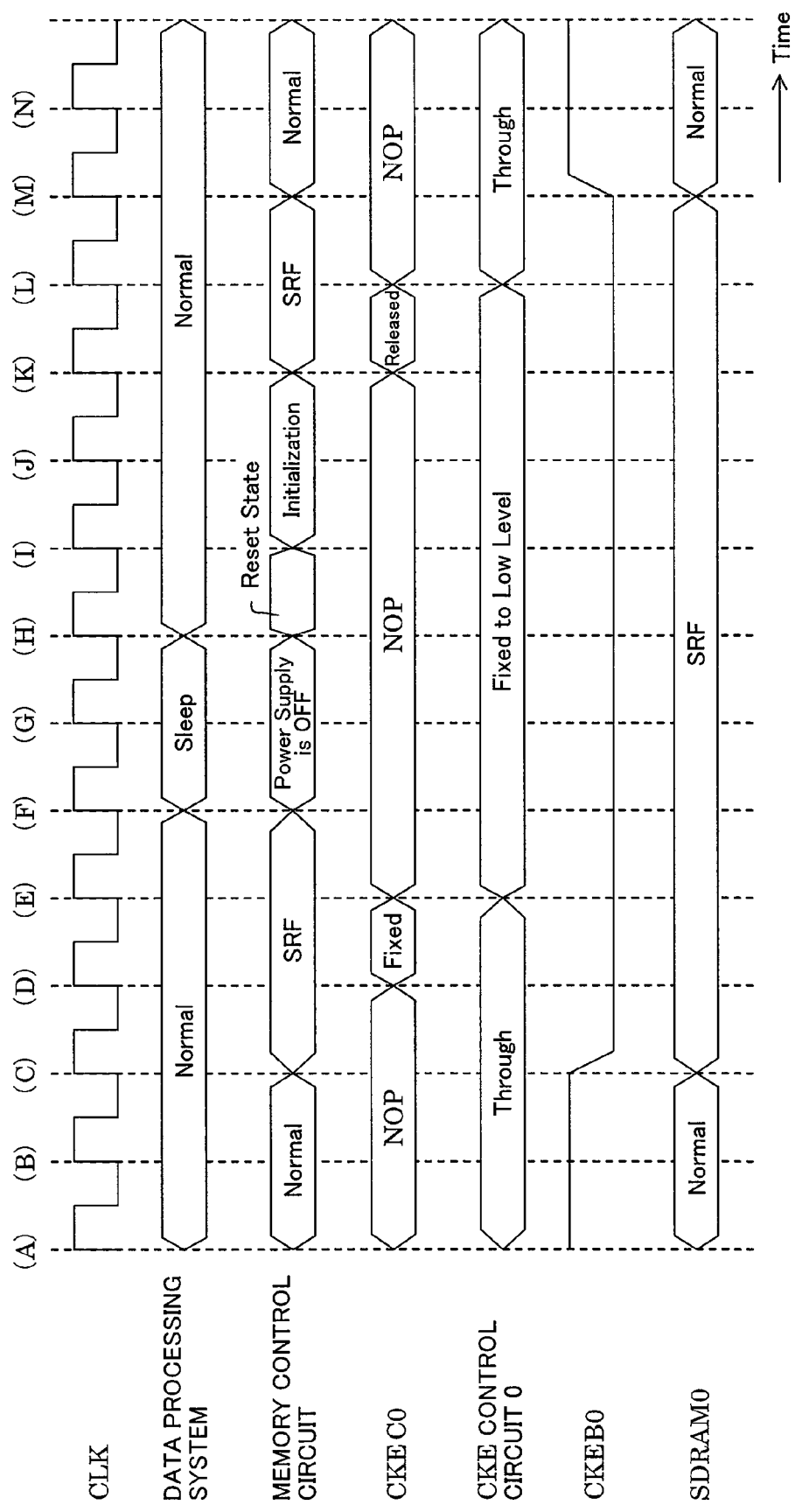
FIG. 2 is a timing chart for illustrating an example of an operation of the memory control device in FIG. 1.

FIG. 2 shows an example of a timing with which, after the data processing system 100 of FIG. 1 shifts from a normal state to a sleep state, it returns from the sleep state to the normal state. A description will be given only to a shift of the SDRAM0 to a SRF mode.

First, with the timing A, the data processing system 100 shows the normal state, the memory control circuit 111 shows the normal state, the CKEC0 shows a no-operation state, the CKE control circuit0 shows a through mode in which the CKEA0 is outputted as the CKEB0 without any alteration, the CKEB0 shows a High level, and the SDRAM0 shows the normal state. In a stage previous to the shift of the data processing system 100 to the sleep state, the processor 130 controls the memory control circuit 111 with the timing C such that it shifts the SDRAM0 to the SRF mode. At this time, the memory control circuit 111 changes the CKEA0 to the Low level so as to shift the SDRAM0 to the SRF mode. The CKEA0 passes through the CKE control circuit0 without any alteration to be outputted as the CKEB0 to the SDRAM0. With the timing D, the memory control circuit 111 outputs the CKEC0 to the CKE control circuit0 such that it fixes the CKEB0 to the Low level. With the timing E, the CKE control circuit0 fixes the CKEB0 to the Low level. While the CKE control circuit0 fixes the CKEB0 to the Low level, the CKEB holds the Low level even when the CKEA0 outputted from the memory control circuit 111 changes. With the timing F, the power supply control unit 150 halts a power supply provided to the memory control circuit 111, while sustaining a power supply to the CKE control circuit0. At the same time, the data processing system 100 enters the sleep state. At this time, the memory control circuit 111 is in the power-supply halted state and the SDRAM0 is in the SRF mode so that the data processing system 100 achieves a high power saving effect, while retaining the data stored in the SDRAM0.

When the data processing system 100 returns to the normal state, the power supply control unit 150 provides a power supply to the memory control circuit 111 with the timing H, while the reset control unit 140 outputs a reset signal to the memory control circuit 111, so that the memory control circuit 111 enters a reset state. With the timing I, the reset control unit 130 releases the reset so that the memory control circuit 111 initiates the initialization of the circuit. With the timing K, the memory control circuit 111 completes the initialization and initiates SRF control, while simultaneously outputting the CKEC0 such that the CKE control circuit0 shifts to the through mode. With the timing L, the CKE control circuit0 receives the CKEC0 and shifts to the through mode so that the CKEA0 outputted from the memory control circuit 111 is outputted as the CKEB0 without any alteration to the SDRAM0. With the timing M, the memory control circuit 111 changes each of the CKEA0 and the CKEB0 to the High level and returns the SDRAM0 from the SRF mode to the normal state.

Thus, with the structure of FIG. 1, it is possible to halt the power supply provided to the memory control circuit 111 when the data processing system 100 is in the sleep state, while maintaining the SRF mode of the SDRAM0. Accordingly, a high power saving effect can be achieved.

The timings with which the data processing system 100 shifts to the sleep state and returns from the sleep state to the normal state are not limited to the timings shown in the present embodiment. Opportunities with which the memory control circuit 111 shifts the SDRAM0 to the SRF mode when the data processing system 100 shifts from the sleep state and returns from the sleep state are given not only by software control performed from the processor 130 and may also be given by hardware control using a sequencer. When the data processing system 100 is in the sleep state, the SDRAM0 is not necessarily in the SRF mode. When data retention is unnecessary, the SDRAM0 may also be in a DPD mode or in a low-power-consumption mode other than the DPD mode.

Figure 3:
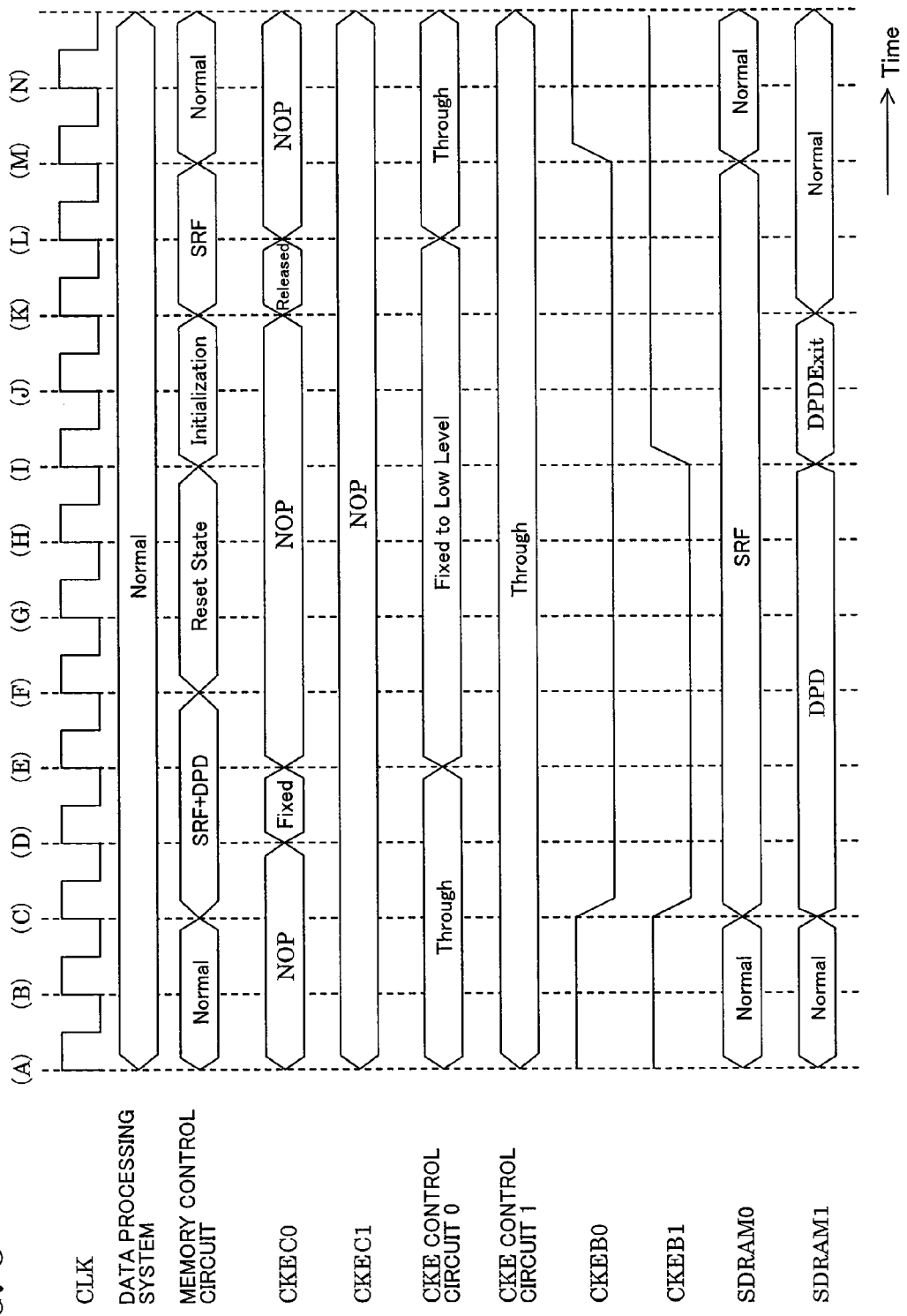
FIG. 3 is a timing chart for illustrating another example of the operation of the memory control device in FIG. 1.

FIG. 3 shows an example of timings when the SDRAM0 and the SDRAM1 are shifted to the SRF mode and the DPD mode, respectively, and then both of the SDRAM0 and the SDRAM1 are returned to the normal state. The memory control circuit 111 can control a shift to the SRF mode as well as a return therefrom, but can control only a shift to the DPD mode. Because a control method for a return from the DPD mode is the same as that during the initialization of the SDRAM1, it is assumed that the return from the DPD mode is implemented by setting a reset and releasing the reset for the simplification of the memory control circuit 111.

Under the situation described above, when the SDRAM1 is returned from the DPD mode in the conventional memory control circuit, the memory control circuit 111 is reset so that the SDRAM0 is also controlled to be initialized. Consequently, the SDRAM0 in the SRF mode cannot hold data. According to the present embodiment, it is possible to return the SDRAM1 from the DPD mode, while retaining data in the SDRAM0, as will be described hereinbelow.

In FIG. 3, the SDRAM0 and the SDRAM1 are each in the normal state at the timing A. With the timing C, the SDRAM0 and the SDRAM1 are shifted to the SRF mode and the DPD mode, respectively. At this time, the CKEB0 and the CKEB1 are both changed to the Low level. Specifically, the SDRAM0 is shifted to the SRF mode by setting the CS0 Low, setting the RAS, the CAS, and the WE supplied to the SDRAM0 Low, Low, and High, respectively, and setting the CKEB0 Low. On the other hand, the SDRAM1 is shifted to the DPD mode by setting each of the RAS, the CAS, and the WE supplied to the SDRAM1 High and setting the CKEB1 Low.

When the SDRAM1 is returned from the DPD mode to the normal state in this condition, the memory control circuit 111 gives an instruction for fixation to the Low level using the CKEC0 with the timing D. The CKE control circuit0 fixes the CKEB0 to the Low level with the timing E. Then, with the timing F, the reset control unit 140 outputs a reset signal to the memory control circuit 111 so that the memory control circuit 111 enters the reset state. With the timing I, the reset control unit 140 releases the reset on the memory control circuit 111 so that the memory control circuit 111 attempts to perform an initialization operation with respect to the SDRAM0 and the SDRAM1. At this time, each of the CKEA0 and the CKEA1 outputted from the memory control circuit 111 is controlled to be on the High level. However, since the CKE control circuit0 has fixed the CKEB0 to the Low level, the SDRAM0 maintains the SRF mode. In addition, because the CKE control circuit1 is in the through mode, the CKEB1 changes to the High level outputted from the memory control circuit 111 so that the SDRAM1 enters a state returning from the DPD mode. When the memory control circuit 111 completes the initialization operation with the timing K, the SDRAM1 completes the return from the DPD mode to enter the normal state. At the same time, the memory control circuit 111 outputs the CKEC0 to the CKE control circuit0 such that it releases the control for fixation to the Low level. Thereafter, the CKE control circuit0 enters the through mode with the timing L so that the CKEA0 outputted from the memory control circuit 111 is supplied as the CKEB0 without any alteration to the SDRAM0. In the condition thus reached, the SDRAM0 holds the SRF mode and the SDRAM1 enters the normal state.

Finally, to also return the SDRAM0 to the normal state, the memory control circuit 111 changes each of the CKEA0 and the CKEB0 to the High level and the SDRAM0 returns to the normal state. Up to this point, each of the SDRAM0 and the SDRAM1 has entered the normal state.

Thus, in the structure of FIG. 1, the memory control device 110 is connected to the plurality of SDRAMs 120 and 125, and it is possible to set and release the reset on the memory control circuit 111 when each of the SDRAMs 120 and 125 is in the low-power-consumption mode, while maintaining the low-power-consumption mode thereof.

The timings with which each of the SDRAMs 120 and 125 is shifted to the low-power-consumption mode and returned from the lower-power-consumption mode to the normal state are not limited to the timings shown in the present embodiment. Moreover, the low-power-consumption modes of the SDRAMs 120 and 125 are not limited to the modes shown in the present embodiment. The SDRAMs connected to the memory control device 110 are not limited to two. Instead, one SDRAM or three or more SDRAMs may also be connected thereto, and the respective low-power-consumption modes of the SDRAMs may also be different.

Figure 4:
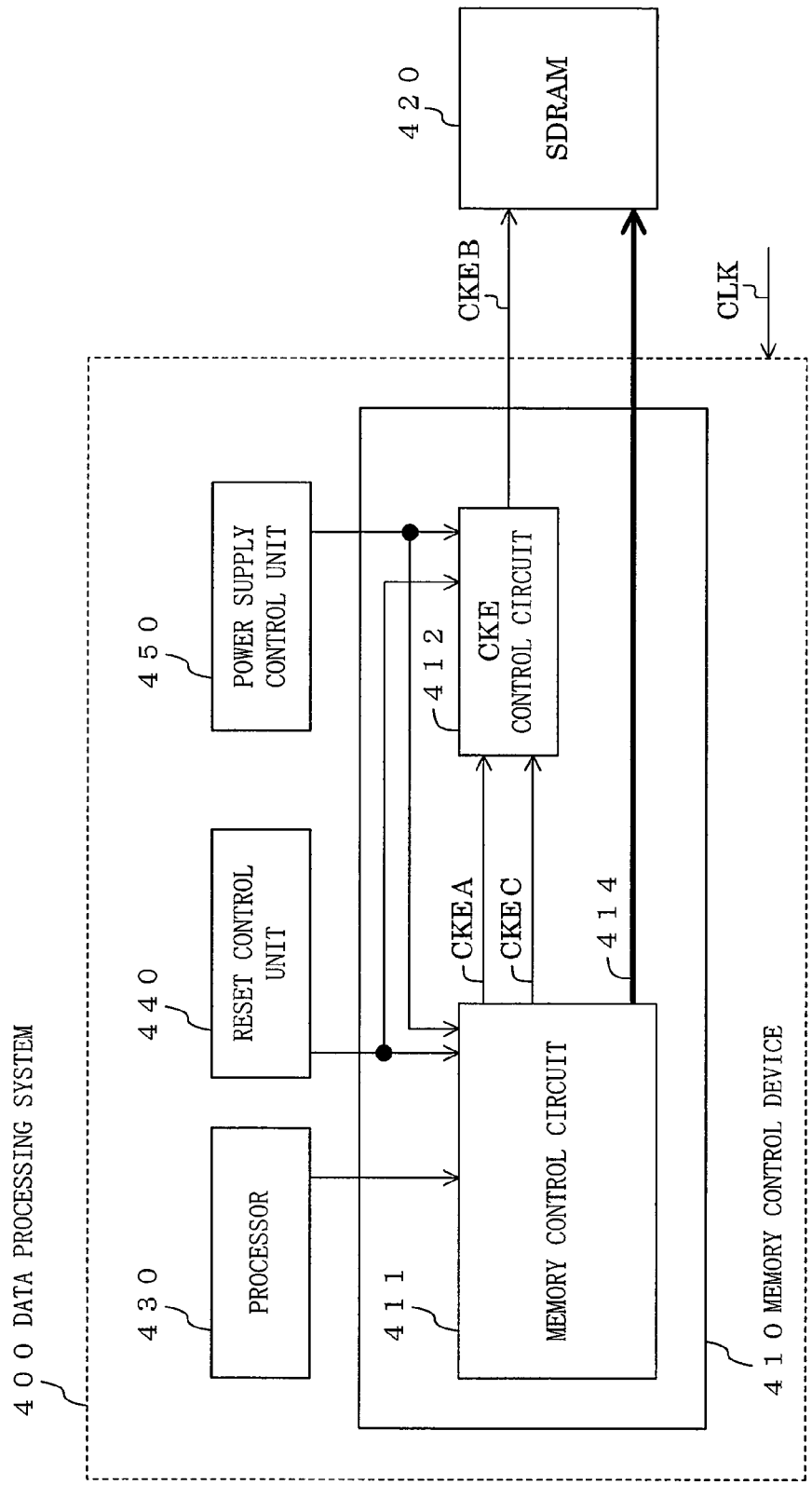
FIG. 4 is a block diagram showing another example of the structure of the memory control device according to the present invention and an example of a connection between the data processing system comprising the memory control device and a single SDRAM.

FIG. 4 shows an example of a structure of a memory control device 410 according to the present invention and an example of a connection between a data processing system 400 comprising the memory control device 410 and a single SDRAM 420. The data processing system 400 and the SDRAM 420 constitute single information processing equipment.

The data processing system 400 of FIG. 4 comprises the memory control device 410, a processor 430, a reset control unit 440, and a power supply control unit 450. The memory control device 410 comprises a memory control circuit 411 and a CKE control circuit 412. CLK denotes a clock signal given to the data processing system 400.

In the memory control device 410 of FIG. 4, the memory control circuit 411 has the function of controlling an operation of the SDRAM 420, specifically the function of controlling a read/write access, a refresh operation, a low-power-consumption mode, and the like. The CKE control circuit 412 receives a CKE signal (CKEA) and a CKE control signal (CKEC) each supplied from the memory control circuit 411 to pass the CKEA as a CKEB without any alteration and supply it to the SDRAM 420 or fix the CKEB to be supplied to the SDRAM 420 to the Low level irrespective of the CKEA in accordance with an instruction given by the CKEC 414 denotes a memory control bus between the memory control circuit 411 and the SDRAM 420.

The processor 430 gives various commands to the memory control circuit 411. From the reset control unit 440, a 1-system reset signal is outputted to each of the memory control circuit 411 and the CKE control circuit 412. From the power supply control unit 450, a power supply common to the memory control circuit 411 and the CKE control circuit 412 is provided thereto. The hardware of the memory control circuit 411 is constructed to hold the CKEC immediately before entering the power-supply halted state till an instruction for a change is given next.

Figure 5:
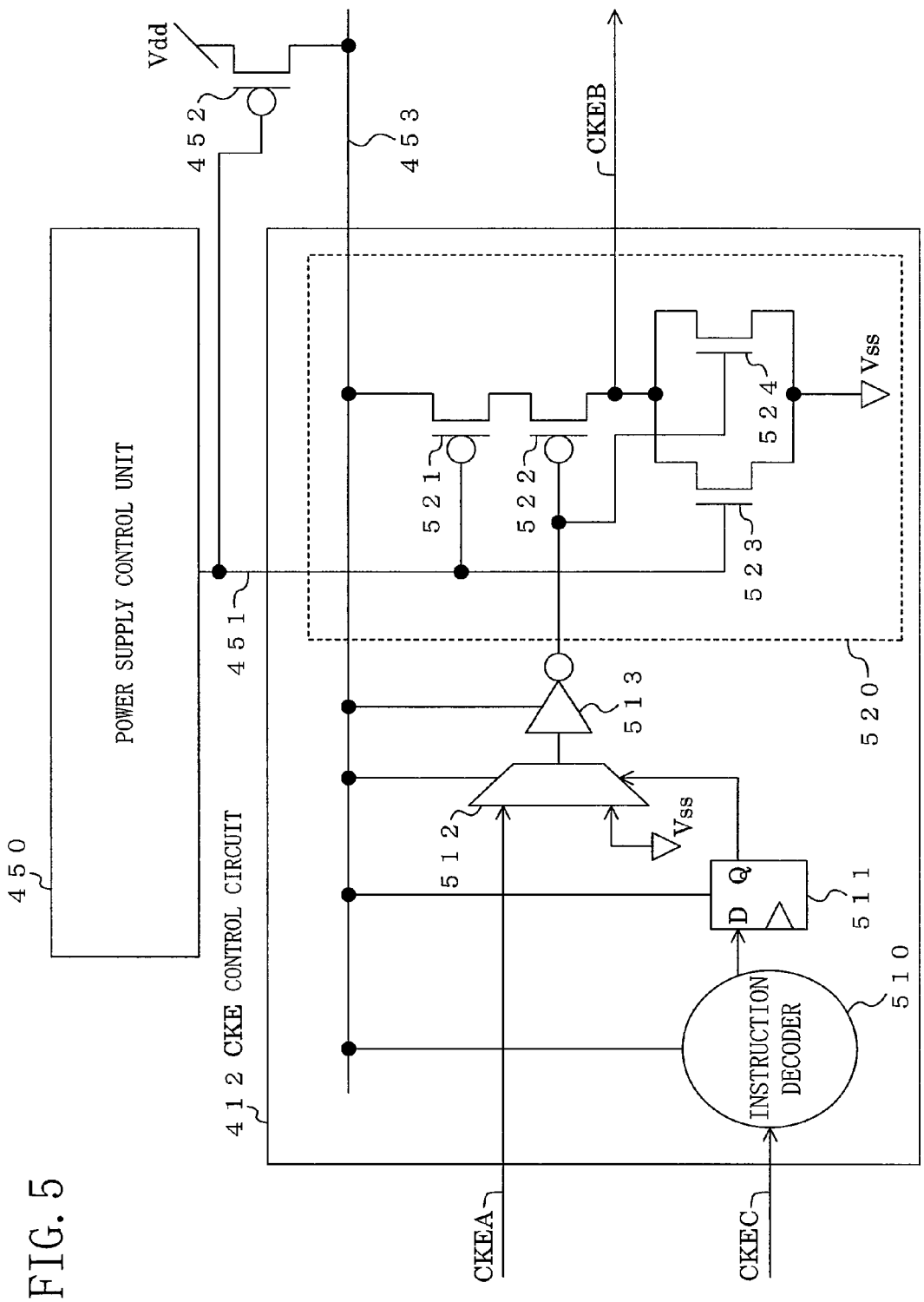
FIG. 5 is a circuit diagram showing an example of a detailed structure of a CKE control circuit in FIG. 4.

FIG. 5 shows an example of a detailed structure of the CKE control circuit 412 in FIG. 4. The CKE control circuit 412 of FIG. 5 comprises an instruction decoder 510, a D flip-flop 511, a selector 512, an inverter 513, and a NOR circuit 520. The instruction decoder 510 corresponds to the above-mentioned combinational logic circuit for decoding the CKEC preferably transmitted via two pulse signal lines and sets or resets the D flip-flop. The selector 512 outputs the CKEA as the CKEB without any alternation or outputs a signal fixed to the Low (Vss) level as the CKEB in accordance with an output of the D flip-flop 511. The inverter 513 supplies an output of the selector 512 to the NOR circuit 520 as one input thereof.

In FIG. 5, 451 denotes a power supply control signal 451, and 452 denotes a power supply control switch composed of, e.g., a P-channel MOS transistor. The power supply control switch 452 is interposed between the power supply Vdd and a power supply line 453 for the memory control device 410 and controlled to be turned on/off in response to the power supply control signal 451. The power supply line 453 is a power supply line common to the memory control circuit 411 and the CKE control circuit 412. When the power supply control signal 451 is on the Low level, the power supply control switch 452 is turned on to provide a power supply to the power supply line 453. When the power supply control signal 451 is on the High level, the power supply control switch 452 is turned off to halt the power supply to the power supply line 453.

The NOR circuit 520 is composed of first and second P-channel MOS transistors 521 and 522 and first and second N-channel MOS transistors 523 and 524. The first P-channel MOS transistor 521 has a source connected to the power supply line 453, a drain connected to the source of the second P-channel MOS transistor 522, and a gate connected to the power supply control signal 451. The second P-channel MOS transistor 522 has the source connected to the drain of the first P-channel MOS transistor 521, a drain connected to an output line for the CKEB, and a gate connected to the output of the inverter 513. The first N-channel MOS transistor 523 has a source connected to the ground Vss, a drain connected to the output line for the CKEB, and a gate connected to the power supply control signal 451. The second N-channel MOS transistor 524 has a source connected to the Vss, a drain connected to the output line for the CKEB, and a gate connected to the output of the inverter 513. In the state where the power supply control signal 451 is on the Low level and the power supply is provided to the power supply line 453, the first P-channel MOS transistor 521 is on, while the first N-channel MOS transistor 523 is off. In this state, the second P-channel MOS transistor 522 and the second N-channel MOS transistor 524 operate as a single inverter so that a signal obtained by inverting the output of the inverter 513 becomes the CKEB. On the other hand, in the state where the power supply control signal 451 is on the High level and the power supply to the power supply line 453 is halted, the first N-channel MOS transistor 523 is on so that the CKEB is fixed to the Low level. It is to be noted that, as long as the power supply signal 451 is on the High level, the CKEB as the output of the NOR circuit 520 is fixed to the Low level even when the power supply to the power supply line 453 is halted.

Figure 6:
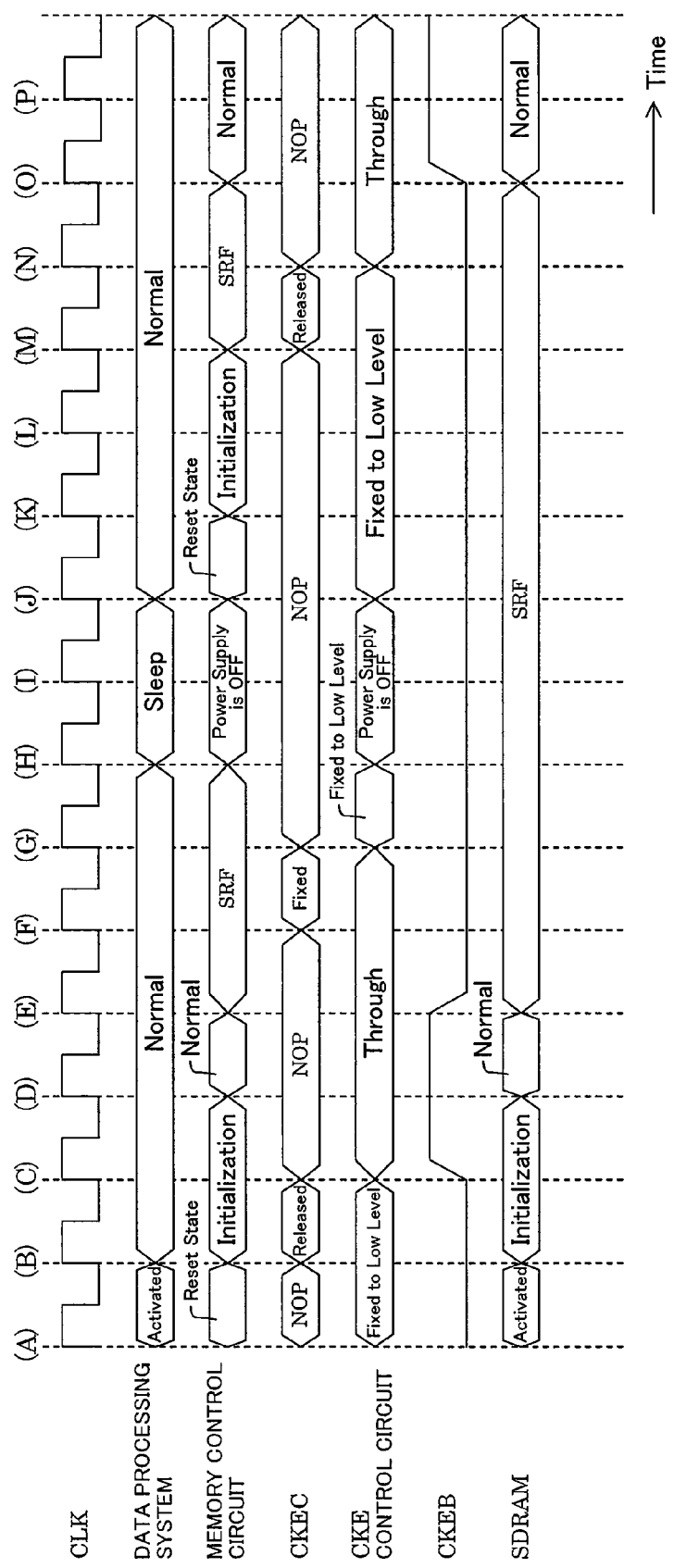
FIG. 6 is a timing chart for illustrating an example of an operation of the memory control device in FIG. 4.

FIG. 6 shows an example of a timing with which, after the data processing system 400 of FIG. 4 is activated and shifts from the normal state to the sleep state, it returns from the sleep state to the normal state. A description will be given to the case where the SDRAM 420 shifts to the SRF mode.

First, with the timing A, each of the data processing system 400 and the SDRAM 420 is activated, while each of the memory control circuit 411 and the CKE control circuit 412 simultaneously enters the reset state. Since the reset state of the CKE control circuit 412 is a mode in which the CKEB is fixed to the Low level, the CKE control circuit 412 fixes the CKEB to the Low level irrespective of the level of the CKEA as the output of the memory control circuit 411. With the timing B, the data processing system 400 enters the normal state and the reset on each of the memory control circuit 411 and the CKE control circuit 412 is released so that the memory control circuit 411 initiates an initialization operation, while the CKE control circuit 412 continues to stay in the fixed-Low-level mode. At the same time, the memory control circuit 411 controls the CKEC so as to shift the CKE control circuit 412 to the through mode. With the timing C, the CKE control circuit 412 shifts to the through mode as a result of controlling the CKEC so that the CKEB changes to the High level. With the timing D, the initialization of the SDRAM 420 is completed so that the SDRAM 420 enters the normal state. With the timing E, the processor 430 controls the memory control circuit 411 such that it shifts the SDRAM 420 to the SRF mode. At this time, the memory control circuit 411 issues a SRF command to shift the SDRAM 420 to the SRF mode, while simultaneously changing the CKEA to the Low level. At this time, the CKEA on the Low level passes through the CKE control circuit 412 without any alteration to be outputted as the CKEB to the SDRAM 420. With the timing F, the memory control circuit 411 outputs the CKEC to the CKE control circuit 412 such that it fixes the CKEB to the Low level. With the timing G, the CKE control circuit 412 fixes the CKEB to the Low level. While the CKE control circuit 412 fixes the CKEB to the Low level, the CKEB holds the Low level even when the CKEA outputted from the memory control circuit 411 changes. With the timing H, the power supply control unit 450 halts the power supply provided to the memory control device 410 to change the power supply control signal 451 from the Low level to the High level. As a result, the CKEB as the output of the NOR circuit 520 is fixed to the Low level. At the same time, the data processing system 400 enters the sleep state. At this time, the memory control device 410 is in the power-supply halted state and the SDRAM 420 is in the SRF mode so that the data processing system 400 achieves a high power saving effect, while retaining the data stored in the SDRAM 420.

When the data processing system 400 returns to the normal state, the power supply control unit 450 changes the power supply control signal 451 to the Low level with the timing J so as to initiate the power supply to the memory control device 410, while the reset control unit 440 outputs a reset signal to the memory control device 410, so that the memory control circuit 411 enters the reset state. At this time, since the CKE control circuit 412 is in the fixed-Low-level mode and therefore the CKEB is fixed to the Low level irrespective of the level of the CKEA, the SDRAM 420 maintains the SRF mode. With the timing K, the reset control unit 440 releases the reset so that the memory control circuit 411 initiates the initialization of the circuit. At this time, because the memory control circuit 411 senses that there was a control operation for a shift to the SRF mode from the processor 430 before the power is turned off, the memory control circuit 411 does not output the CKEC for a shift to the through mode to the CKE control circuit 412 with this timing. With the timing M, the memory control circuit 411 completes the initialization and initiates the SRF control, while simultaneously outputting the CKEC such that the CKE control circuit 412 shifts to the through mode. With the timing N, the CKE control circuit 412 shifts to the through mode in response to the CKEC, while the CKEA outputted from the memory control circuit 411 is outputted as the CKEB without any alteration to the SDRAM 420. With the timing O, the memory control circuit 411 changes each of the CKEA and the CKEB to the High level to return the SDRAM 420 from the SRF mode to the normal state.

Thus, with the structure shown in FIGS. 4 and 5, it is possible to halt the power supply provided to both of the memory control circuit 411 and the CKE control circuit 412 when the data processing system 400 is in the sleep state, while maintaining the SRF mode of the SDRAM 420. As a result, a higher power saving effect can be achieved.

It is to be noted that the circuit for fixing the output CKEB, while the power supply to the CKE control circuit 412 is halted, is not limited to the NOR circuit 520. The circuit may also be a NAND circuit or a logic circuit other than the NAND circuit.

INDUSTRIAL APPLICABILITY

As described above, the memory control device according to the present invention allows the volatile semiconductor memory to maintain the low-power-consumption mode even when the power supply to the memory control circuit is halted or the memory control circuit is reset, so that it is useful for the construction of a memory system such as mobile equipment.

It will be easily appreciated that the present invention is also applicable to a memory control device for a volatile semiconductor memory other than a SDRAM.

What is claimed is:

1. A method for controlling a plurality of volatile semiconductor memories each of which operates in a deep-power-down mode or a self-refresh mode, the method comprising steps of:

fixing a specified signal to be outputted to at least one of the volatile semiconductor memories which is in the self-refresh mode to a predetermined logic level on which the volatile semiconductor memory in the self-refresh mode maintains the self-refresh mode; and returning at least one of the volatile semiconductor memories which is in the deep-power-down mode to a normal state, while maintaining the self-refresh mode of the at least one of the volatile semiconductor memories in the self-refresh mode which received the fixed specified signal.

2. A memory control device for controlling a plurality of volatile semiconductor memories each of which operates in a deep-power-down mode or a self-refresh mode, the memory control device comprising:

a plurality of control circuits connected correspondingly to the plurality of volatile semiconductor memories; and a memory control circuit connected to each of the plurality of control circuits, wherein each one of the control circuits corresponding to at least one of the volatile semiconductor memories which is in the self-refresh mode fixes a specified signal to be outputted to the at least one of the volatile semiconductor memories in the self-refresh mode to a predetermined logic level on which the at least one of the volatile semiconductor memories in the self-refresh mode maintains the self-refresh mode, and continues to fix the specified signal outputted to the at least one of the volatile semiconductor memories in the self-refresh mode to the predetermined logic level, even when at least one of the volatile semiconductor memories which is in the deep-power-down mode returns to a normal state.

3. The method of claim 1, wherein in the deep-power-down mode, data in the volatile semiconductor memories are not retained.

4. The device of claim 2, wherein in the deep-power-down mode, data in the volatile semiconductor memories are not retained.

5. A memory control device for controlling a plurality of volatile semiconductor memories each of which operates in a deep-power-down mode or a self-refresh mode, the memory control device comprising:

a mode control circuit configured to control an operation mode of a first volatile semiconductor memory of the plurality of volatile semiconductor memories and an operation mode of a second volatile semiconductor memory of the plurality of volatile semiconductor memories; and a memory control circuit coupled to the mode control circuits and the plurality of volatile semiconductor memories, wherein the mode control circuit is configured to maintain the first volatile semiconductor memory in a self-refresh mode, regardless of change in the operation mode of the second volatile semiconductor memory changed by the memory control circuit.

* * * * *